US006962084B2

(12) United States Patent
Gall

(10) Patent No.: US 6,962,084 B2
(45) Date of Patent: Nov. 8, 2005

(54) SENSOR WITH MOLDED SENSOR DIAPHRAGM COVER

(75) Inventor: Kenneth E. Gall, Rock City, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/635,277

(22) Filed: Aug. 6, 2003

(65) Prior Publication Data

US 2005/0028596 A1 Feb. 10, 2005

(51) Int. Cl.[7] .................................................. G01L 7/08
(52) U.S. Cl. .......................... 73/715; 73/730; 73/729.1
(58) Field of Search ................................... 73/700–756

(56) References Cited

U.S. PATENT DOCUMENTS

| | | | | |
|---|---|---|---|---|
| 4,454,440 | A | 6/1984 | Cullen | 310/313 R |
| 4,586,382 | A | 5/1986 | Sinha | 73/703 |
| 4,978,941 | A | 12/1990 | Brown | 340/447 |
| 5,488,868 | A | 2/1996 | Ootake et al. | 73/708 |
| 5,818,002 | A | * 10/1998 | Kurtz et al. | 200/83 Y |
| 5,821,425 | A | 10/1998 | Mariani et al. | 73/703 |
| 5,999,082 | A | * 12/1999 | Kurtz et al. | 338/42 |
| 6,079,276 | A | 6/2000 | Frick et al. | 73/718 |
| 6,218,936 | B1 | 4/2001 | Imao | 340/447 |
| 6,259,360 | B1 | 7/2001 | Takamura | 340/445 |
| 6,450,021 | B1 | 9/2002 | Katou et al. | 73/146.5 |
| 6,484,585 | B1 | 11/2002 | Sittler et al. | 73/718 |

FOREIGN PATENT DOCUMENTS

| | | | |
|---|---|---|---|
| DE | 1 573 618 | 5/1970 | G01L/9/01 |
| EP | 0 511 762 A2 | 11/1992 | G01L/23/10 |
| EP | 0 511 762 A3 | 11/1992 | G01L/23/10 |
| WO | WO 02/31461 A1 | 4/2002 | G01L/9/00 |

OTHER PUBLICATIONS

PCT Notification of Transmittal of The International Search Report and The Written Opinion of the International Searching Authority, or the Declaration—Date of Mailing Dec. 9, 2004.

* cited by examiner

*Primary Examiner*—William Oen
*Assistant Examiner*—Jermaine Jenkins
(74) *Attorney, Agent, or Firm*—Kris T. Fredrick; Kermit D. Lopez

(57) ABSTRACT

A diaphragm cover apparatus and method for a sensor are disclosed. A sensor cover is located proximate to a base. A dimple can be located centrally within the cover, wherein the dimple comprises a component that is separate from the sensor cover and diaphragm. The dimple contacts a sense element of the sensor. Additionally, a foil can be adapted for use in blocking air permeation through the sensor diaphragm, when the sensor experiences pressure. An over mold diaphragm is generally located as part of the sensor cover. The dimple itself comprises a highly polished surface to reduce stress concentrators from contacting the sense element. The dimple can be formed from materials such as stainless steel, ceramic and the like to optimize the performance of the sensor.

20 Claims, 8 Drawing Sheets

(Section A-A)

(Section A-A)

(DETAIL C)

SENSOR WITH MOLDED SENSOR DIAPHRAGM COVER

TECHNICAL FIELD

The present invention is generally related to sensing methods and systems. The present invention is additionally related to tire pressure sensors utilized in automotive, heavy-duty vehicles, and similar commercial markets. The present invention is also related to sensor cover and base designs.

BACKGROUND OF THE INVENTION

Various sensors are known in the sensing arts. In particular, many different techniques have been proposed for sensing the pressure in tires and for delivering this information to the operator at a central location on the vehicle so that he knows that a tire is at low or high air pressure.

Such sensors generally communicate with the vehicle so that the sensed pressure is displayed to the operator when the vehicle is moving, i.e. the wheel rotating relative to the body of the vehicle. Such devices are generally relatively complex and expensive or alternatively are not particularly robust.

Some tire sensor systems incorporate a sensor that is fixed to the body so no rotating electrical contact between the rotating wheel and the chassis is required. In this system, a sensor rod is deflected by contact with the tire sidewall when the sidewall of the tire is deformed as occurs when the tire pressure is low. This system provides an indication of low tire pressure but is not robust. For example mud or other debris on the wheels may cause faulty readings. Furthermore, this system provides an indication only when the tire pressure is reduced significantly as is necessary for significant tire bulge to occur. Clearly such a system simply cannot provide a reading of actual tire pressure.

In another form of a fixed sensor, the height of the vehicle can be detected and when the height is reduced, it is deemed tire pressure is low. However, if the tire in a rut or is parked on uneven ground, a faulty low-pressure reading is likely to be generated.

More complicated systems are capable of monitoring tire pressure. For example, some sensor systems utilize a rotating encoder formed by a multipolar ring of magnetic segments of different polarity that are distributed circumferentially in a regular and alternating manner. A transmitter coil coaxial with the ring and a fixed pickup (an induction coil system) is energized by alternating electrical current flowing through the transmitter coil to generate a magnetic field superimposed on the magnetic field created by the multipolar ring generates a signal picked up and delivers a signal relating the rotating characteristic of the wheel and thus, the state of the tire.

Some tire pressure systems also utilize a wheel system wherein each sensor on each wheel is provided with a radio transmitter that transmit the information on tire pressure, etc. from the wheel to a radio receiver on the body of the vehicle and this transmitted signal is decoded to provide information on tire pressure etc. and makes it available to the operator. Conventional wireless systems, however, are not durable and are expensive to design and produce.

Sensors can be composed of a sense element on a base and pressure transducer sensor diaphragm that is part of the cover. For a sensor to function properly, the sensor diaphragm must be in intimate contact with the sense element at all pressure levels and temperatures. To compensate for expansion in the packaging, the sense element and sensor diaphragm must be preloaded when they are assembled to shift the output frequency a known amount, which ensures contact at all times. In conventional sensor designs, an interference fit between the cover and base can maintain a preload until the cover and base are locked in place by welding, soldering or other connecting means. This type of interference fit can weaken before the parts are locked together and cause the preload to be reduced.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved sensor apparatus and method.

It is another aspect of the present invention to provide for a sensor cover with a molded diaphragm.

It is a further aspect of the present invention to provide for an improved dimple for a sensor cover for enhanced sensor efficiency and performance.

The aforementioned aspects of the invention and other objectives and advantages can now be achieved as described herein. A diaphragm and cover apparatus and method for a sensor are disclosed. In general, a sensor cover can be located proximate to a base. A dimple can be located centrally within the diaphragm. The dimple, however, is configured as a component that is separate from sensor diaphragm and cover. The dimple contacts the sense element of the sensor.

Additionally, a foil to block air permeation through the sensor diaphragm, when the sensor experiences pressure, can also be implemented. The over-mold portion can be configured as the diaphragm portion or part of the sensor cover. The dimple itself can be formed with a highly polished surface in the area that contacts the sense element to reduce stress concentrators. The dimple can be formed from materials such as stainless steel, ceramic and the like to optimize the performance of the sensor. The sense element can be implemented as a quartz sense element, a silicon sense element, or a ceramic sense element depending upon design constraints.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope thereof.

The invention described herein can be implemented, in accordance with one possible embodiment, as a component of a wireless pressure monitoring system. Such an embodiment can be configured as a small-size device, which is also lightweight and based on battery-less operation. The sensor described herein does not consume power when implemented in the context of a TPMS operation. Thus, the present invention can be embodied in a practical and low cost design solution. Such a design can be mass-produced for automotive, heavy-duty vehicles, and commercial markets.

The sensor described herein can be implemented as a sensor that includes a sense element, a package base, a cover, and a flexible pressure-sensitive diaphragm incorporated into the cover. For the sensor to achieve the application accuracy required, the dimple in the pressure-sensitive diaphragm should preferably be in intimate contact with the sense element at all pressure levels and temperatures. To compensate for thermal expansion of the packaging materials (i.e., base and cover), the sense element (e.g., quartz, ceramic, silicon, etc.) and the sensor diaphragm are preferably preloaded when they are assembled in order to shift the output frequency a known amount to ensure contact at all times. It can be appreciated that embodiments of the present invention can be implemented in context of either a SAW (surface acoustic wave) or non-SAW sensor.

A dimple can be formed in the center of the sensor diaphragm portion of the cover. The dimple generally contacts a flat surface on the sense element, which may be embodied as a small, circular element, or as a square-shaped or rectangular-sized element, depending upon design choices. The design configuration can be implemented in the context of a small, circular, hermetically sealed button package. Example dimensions include approximately 12 mm in diameter and approximately 2 mm thick. It can be of course be appreciated by those skilled in the art that such dimensions are discussed herein for illustrative purposes only, and are not considered limiting features of the present invention. Sensor dimensions may vary, depending on the needs and use of such a device.

The design of the cover and base are such that they generally allow for the reduction of assembly tolerances. The sensor material of the base and cover can be formed from stainless steel 17-7 PH. The advantages of such a material are discussed in greater detail herein. The sensor can also be configured in association with an interface design board. For example, a PCB or flex circuit interconnect can be located between the sensor button package and one or more antennas thereof for the transmission and receipt of wireless data.

Figure 1:
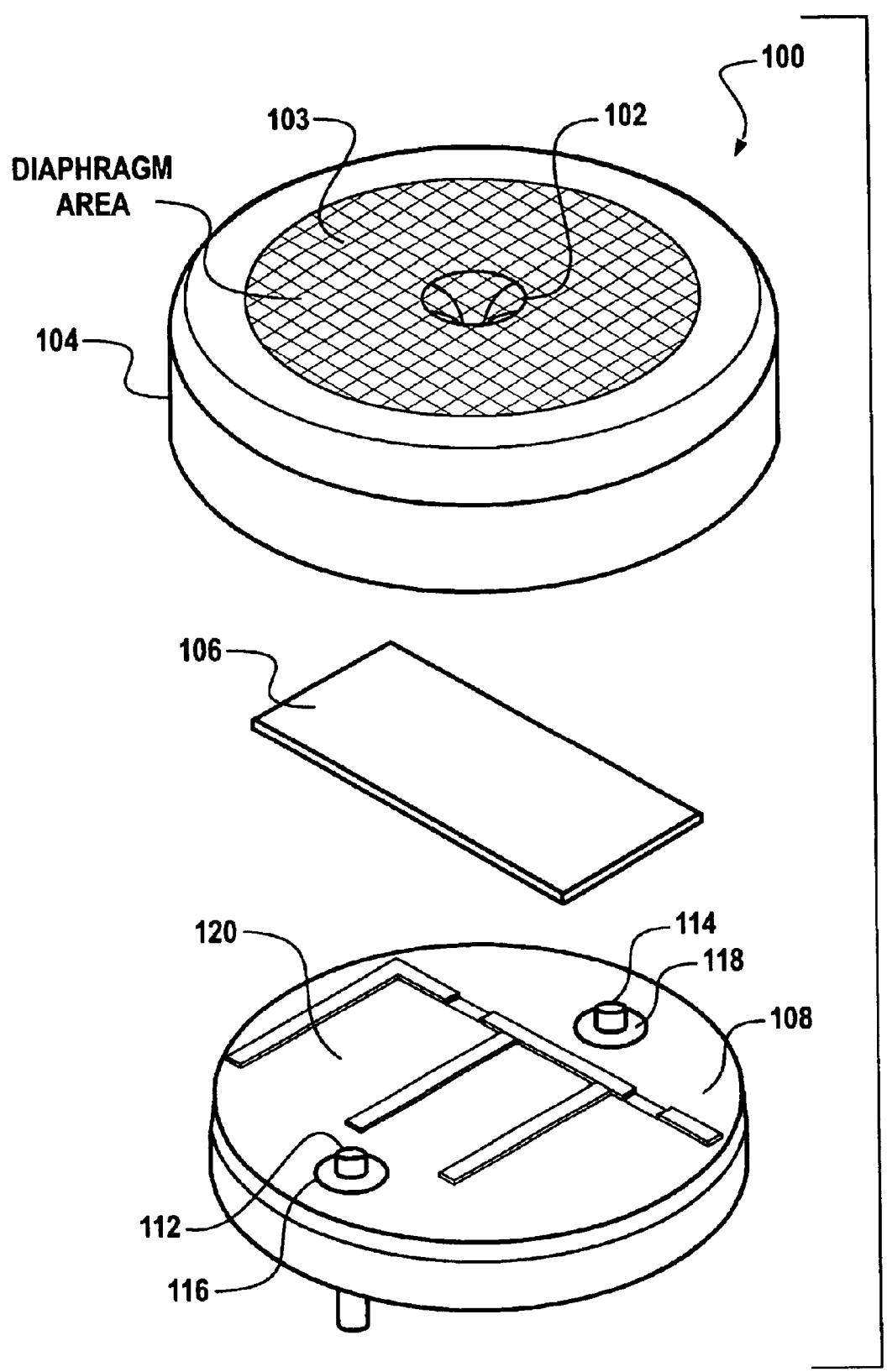
FIG. 1 illustrates an exploded view of a sensor apparatus, which can be implemented in accordance with an embodiment of the present invention.

FIG. 1 illustrates an exploded view of a sensor 100, which can be implemented in accordance with an embodiment of the present invention. Sensor 100 generally includes a package cover 104 that includes a dimple 102 formed at the center of cover 104. Sensor 100 also can include a molded diaphragm or diaphragm area 103. The diaphragm 103 can be molded with a built-in preload to simplify the assembly and pre-load process thereof. Sensor 100 can also include a sense element 106 (e.g., a SAW chip, a quartz, ceramic, silicon, and the like), and a package base 108 Base 108 generally includes a base portion 120, which can be recessed into base 108 and in which the sense element 106 can rest. Dimple 102 can be formed from stainless steel, ceramic, or any type of suitable material that assists in optimizing the performance of sensor 100.

Cover 104 can be formed from a stainless steel, such as, for example, a stainless steel 17-7 PH material. Cover 104 can be initially formed from a flat sheet stock. The cover can next be stamped into a circular shape, and deep drawn into a cup configuration. Next, dimple 102 can be formed into the center of cover 104. It can be of course be appreciated by those skilled in the art that such dimensions are discussed herein for illustrative purposes only, and are not considered limiting features of the present invention. The dimensions of cover 104 may vary, depending on the needs and use of such a device. In general dimple 102 can be configured as a component that is separate from sensor cover 104, such that dimple 102 contacts the sense element 106 of said sensor 100. Cover 104 can be assembled to base 108 until the bottom of cover 104 is "even" with the bottom of base 108, which can result in the production of a preload, which deflects the sensor diaphragm 103.

Base 108 can also be formed from a stainless steel such as a stainless steel 17-7 PH material. Stamping approximately 2 mm thick annealed material into a circular disk can form base 108. Such a disk can be formed so that two small saddles are protruding from base 108 for which the sensor chip (e.g., sense element 106) will rest. Holes 116 and 118 can thus be punched into base 108 to facilitate glass to metal seals thereof. Hole 116 is associated with pin 112, while hole 118 is associated with pin 114. Pins 112 and 114 can be utilized to make an electrical connection through the hermetic seal.

The glass to metal seal process and hardening process can occur simultaneously. The material can be heated to approximately 975 degree centigrade to re-flow the glass and for simultaneous "Austenite Conditioning" (a process well known in the art, which does not need to be described in detail herein) of 17-7 PH stainless steel used for base 108 and cover 104. So-called "Austenite Conditioning" precipitates a significant amount of chromium carbide and prepares it for complete transformation to a hard martensitic plastic. Stainless steel type 17-7 PH can then be cooled to approximately −100 degree Fahrenheit and held 8 hours for complete transformation to a hard "Martensitic" phase for maximum strength and rigidity of the parts. In this condition, the parts are generally hard, but also brittle. The last process involves gold plating the pins 114 and 112 to facilitate wire bonding and soldering.

Finally, the sensor 100 can be assembled and tested. The sensor assembly sequence generally involves the following steps: die attach, wire bond, cover attach, pre-load, weld, after weld test, stabilization bake, after stabilization bake test, PCB attach and chamber test. Cover 104 and base 108 are thus designed to provide an interference fit so that the pre-load process and hermetic seal process can be controlled with increasingly accuracy and efficiency. The cover to base design of sensor 100 also removes assembly tolerances from the tolerance stack because it features a flange-less design.

Figure 2:
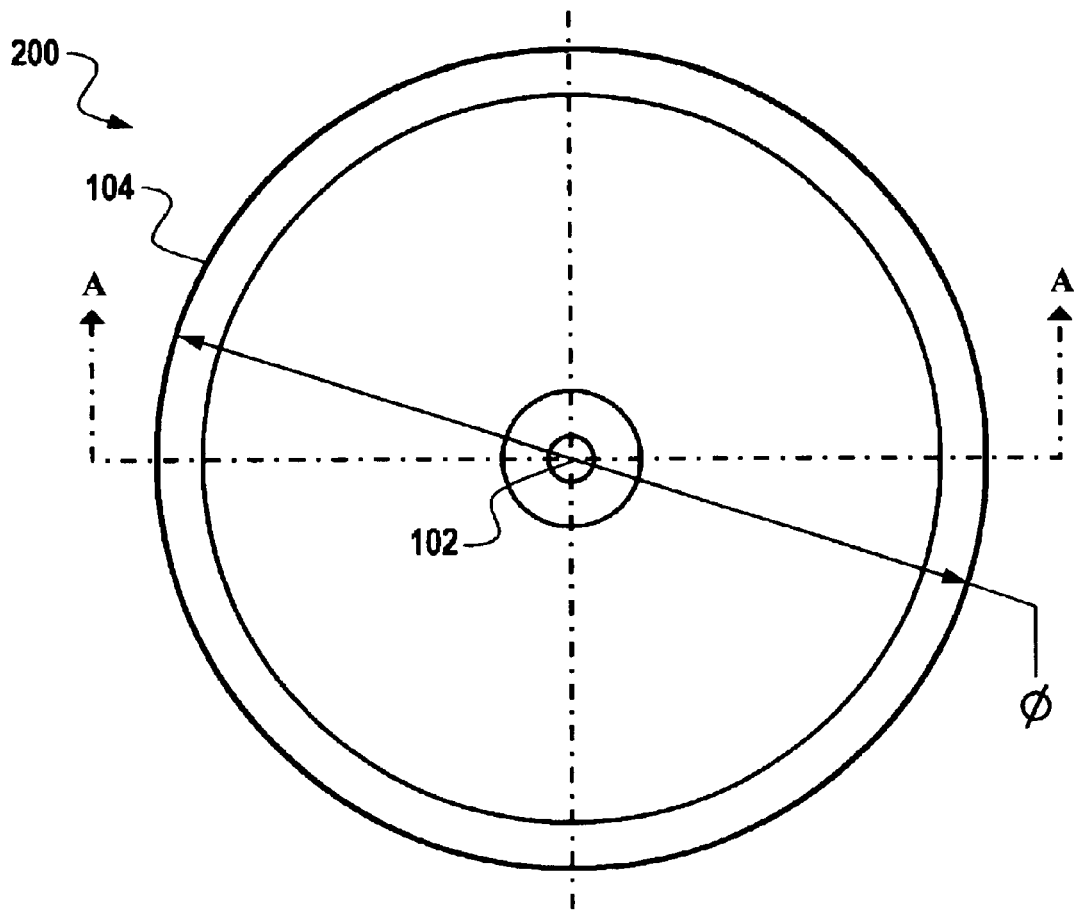
FIG. 2 illustrates a top view of a cover, which can be implemented in accordance with an embodiment of the present invention.
Figure 3:
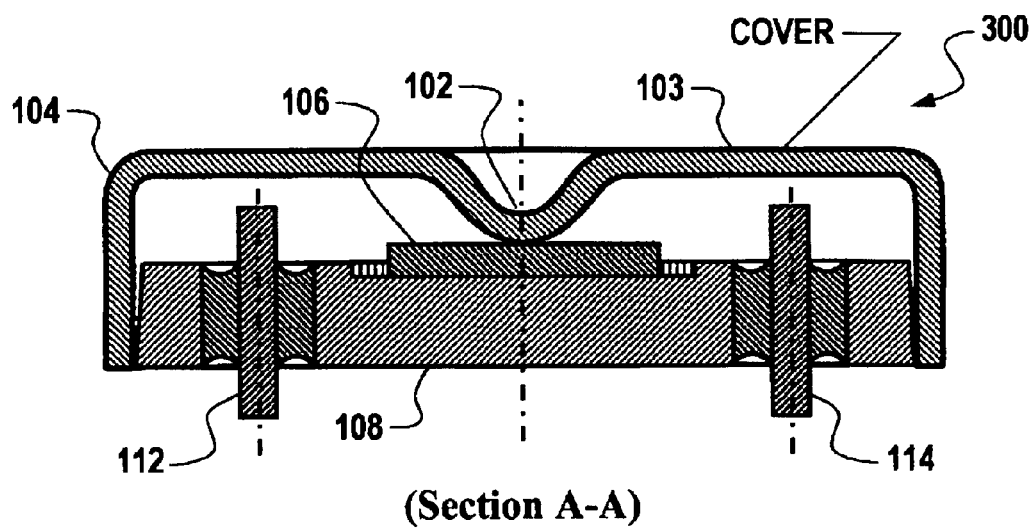
FIG. 3 illustrates a side sectional A—A view of cover depicted in FIG. 2, in which the cover is mounted over a base, in accordance with an embodiment of the present invention.

FIG. 2 illustrates a top view 200 of cover 104, which can be implemented in accordance with an embodiment of the present invention. Note that in FIGS. 1, 2 and 3, like parts or elements are generally indicated by identical reference numerals. FIG. 3 illustrates a side sectional A—A view 300 of cover 104 depicted in FIG. 2, in which cover 104 is mounted over base 108, including pins 112 and 114, in accordance with an embodiment of the present invention. Cover 104 thus generally includes a dimple 102 formed at the center of cover 104. Quartz sense element 106 is depicted in FIG. 3 as located below proximate to dimple 102 and between pins 112 and 114.

Figure 4:
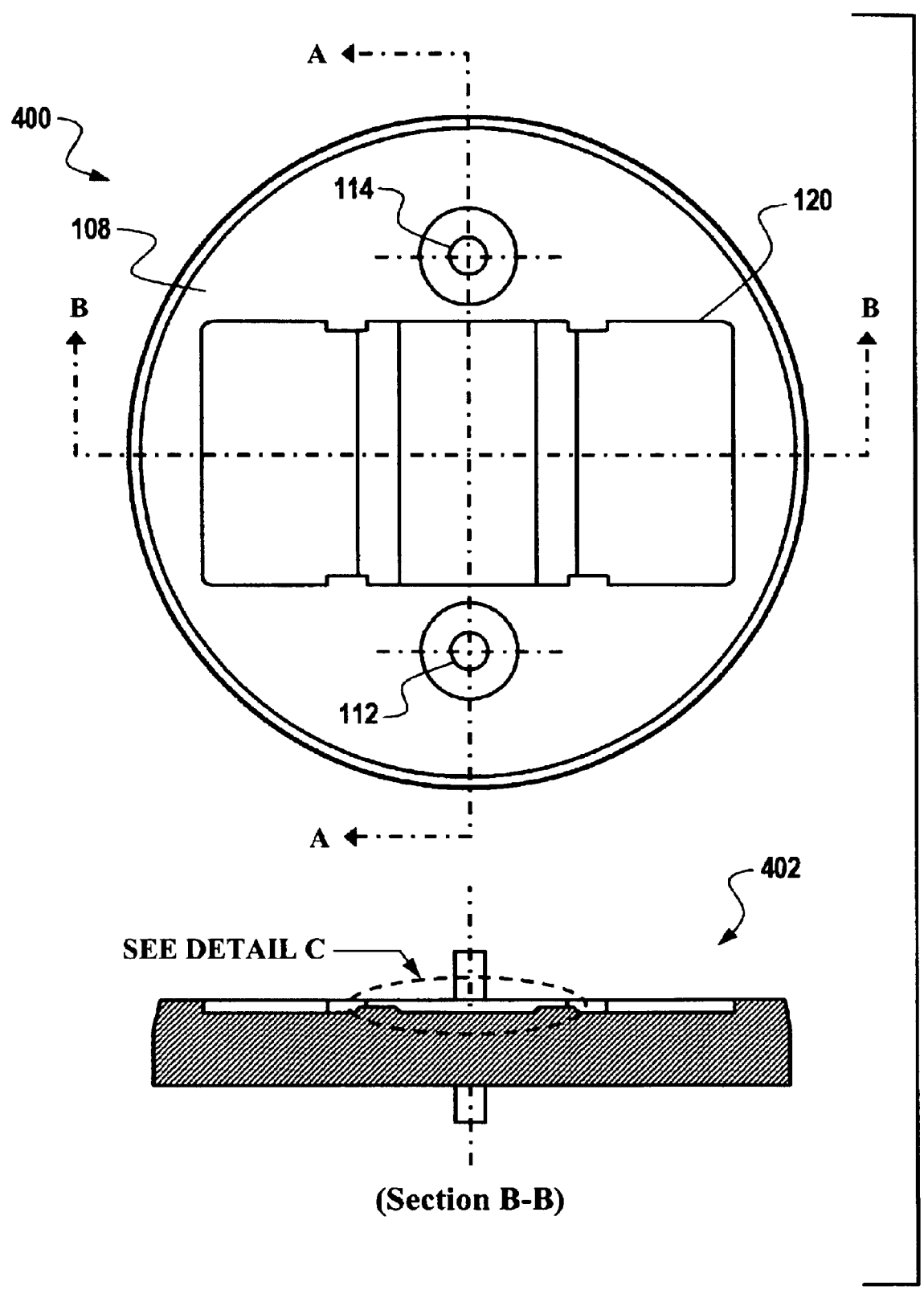
FIG. 4 illustrates top and side sectional views of a metal base, which can be implemented in accordance with an embodiment of the present invention.
Figure 5:
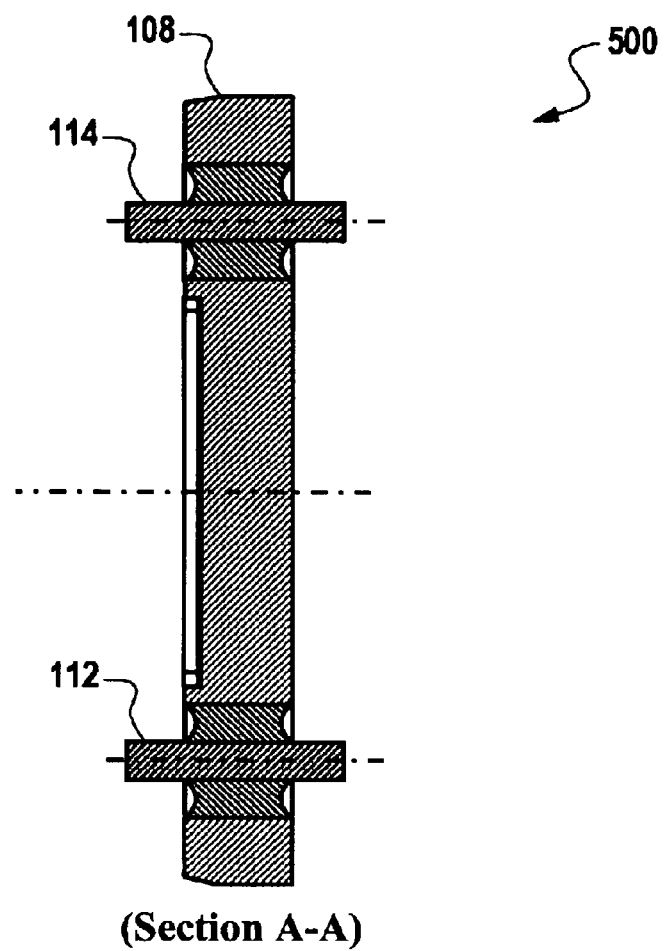
FIG. 5 illustrates a side sectional A—A view of the metal base depicted in FIG. 4, in accordance with an embodiment of the present invention.
Figure 6:
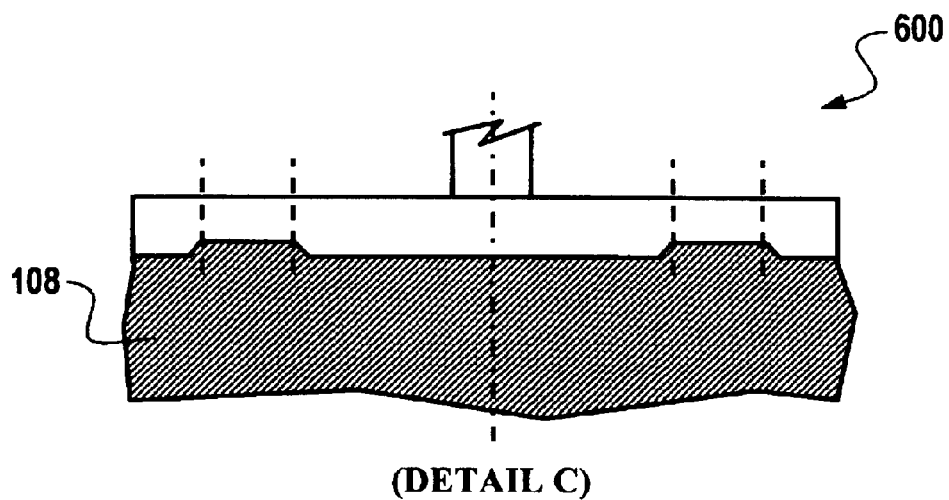
FIG. 6 illustrates detail C view of the metal based depicted in FIG. 4, in accordance with an embodiment of the present invention.

FIG. 4 illustrates respective top and side sectional views 400 and 402 of metal base 108, which can be implemented in accordance with an embodiment of the present invention. FIG. 5 illustrates a side sectional A—A view 500 of the metal base 108 depicted in FIG. 4, in accordance with an embodiment of the present invention. FIG. 6 illustrates a detail view C view 600 of the metal base 108 based depicted in FIGS. 4 and 5, in accordance with an embodiment of the present invention. Note that in FIGS. 1 to 6 herein, like or analogous parts or elements are generally indicated by identical reference numerals.

Figure 7:
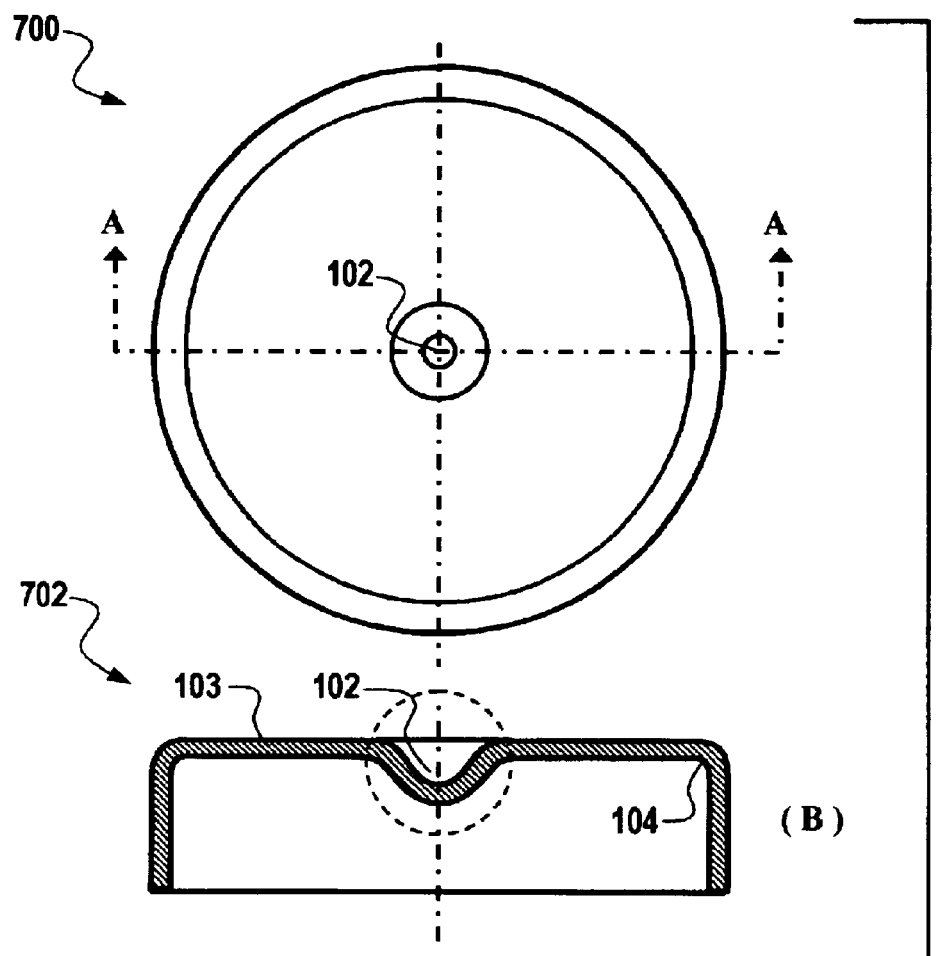
FIG. 7 illustrates top and side sectional views of a cover, which can be implemented in accordance with an alternative embodiment of the present invention.
Figure 8:
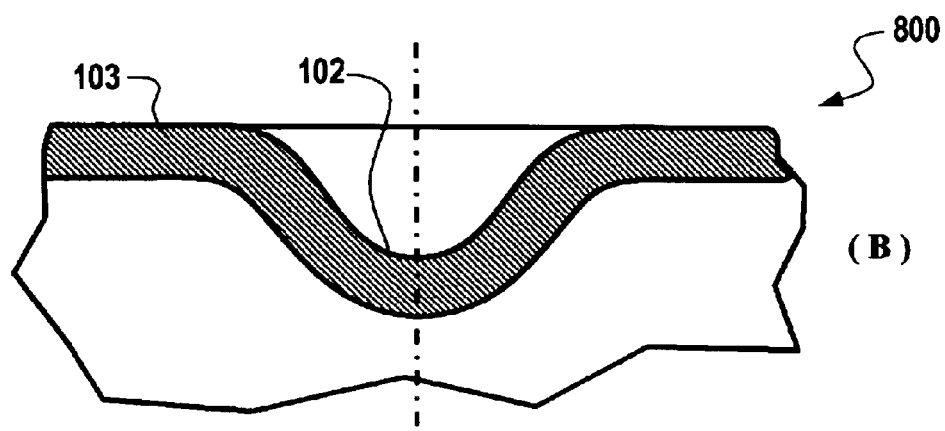
FIG. 8 illustrates a cut-away view of the dimple area of the cover depicted in FIG. 7, in accordance with an alternative embodiment of the present invention.

FIG. 7 illustrates top and side sectional views of cover 104, which can be implemented in accordance with an alternative embodiment of the present invention. FIG. 8 illustrates a cut-away view 800 of the dimple 102 depicted in FIG. 7, in accordance with an alternative embodiment of the present invention. Note that in FIGS. 1 to 8 illustrated herein, like or analogous parts or elements are generally indicated by identical reference numerals. Thus, FIG. 7 illustrates a top view 700 of cover 104, including dimple 102 located at the center of the diaphragm 103 portion or area of cover 104. FIG. 7 also depicts a side sectional view 702 of cover 104, including the location of dimple 102 and diaphragm 103 of cover 104. The cut-away view 800 of cover 104 depicted in FIG. 8 provides a close-up view of dimple 102, and diaphragm 103 of cover 104.

The sensor described herein can be utilized to measure pressure and temperature inside a vehicle tire (e.g., a passenger car tire or truck tire). The sensor should preferably possess a low cross sectional area and thickness, and is generally light weight in configuration and compatible with processes used to mold truck tires and passenger car tires. The pressure sensor base and cover materials preferably have a low-yield strength (e.g., approximately 40,000 psi) in the annealed condition so that the sensor can be fabricated utilizing conventional processes such as machining and forming. The pressure sensor base and cover materials also have a high-yield strength (e.g., approximately 20,000 psi) in the hardened condition so that the sensor possesses an enhanced elastic range and lower deformation in the end application.

The use of a 17-7 PH material as the sensor material for the base and cover is also preferred because the hardening process is also compatible with forming glass to metal seals in the base. The use of a 17-7 PH material for this sensor is an advantage of the present invention because the hardening process and the glass to metal sealing processes are combined. Another advantage of the present invention is that it provides enhanced sensor performance over other conventional pressures sensor designs.

Although not shown in FIGS. 1 to 8 herein, it can be appreciated that in a SAW pressure sensor embodiment, a plurality of resonators (e.g., 3 resonators) can be connected in parallel to an antenna positioned within a tire or any other device requiring pressure sensors. Such a SAW pressure sensor embodiment can be interrogated by a short RF pulse at a frequency of approximately 434 MHz, which can excite natural oscillations of the resonators. The oscillations can be re-radiated by the antenna and received by an interrogation unit. Such an interrogation unit can analyze the spectrum of the oscillators, calculate two different frequencies and find the pressure and the temperature of the tire.

Thus, a pressure sensor can be composed of a sense element on a base and a pressure transducer sensor diaphragm that is molded onto said cover. The cover generally contains features which retain the molded material from which the sensor diaphragm is formed. For the sensor to function properly, the sensor diaphragm should preferably be in intimate contact with the sense element at all pressure levels and temperatures. To compensate for expansion in the packaging, the sense element and sensor diaphragm can be preloaded when they are assembled to shift the output frequency a known amount, which ensures contact at all times. The diaphragm can be molded with a molding material such as plastic, silicone rubber, and the like.

In conventional sensor designs, an interference-fit between the cover and base maintains preload until they are locked in place by welding, soldering or other connecting means. This type of interference fit can lessen before the parts are locked together and cause the preload to be reduced. The design depicted in FIG. 9 below ameliorates this problem.

Figure 9:
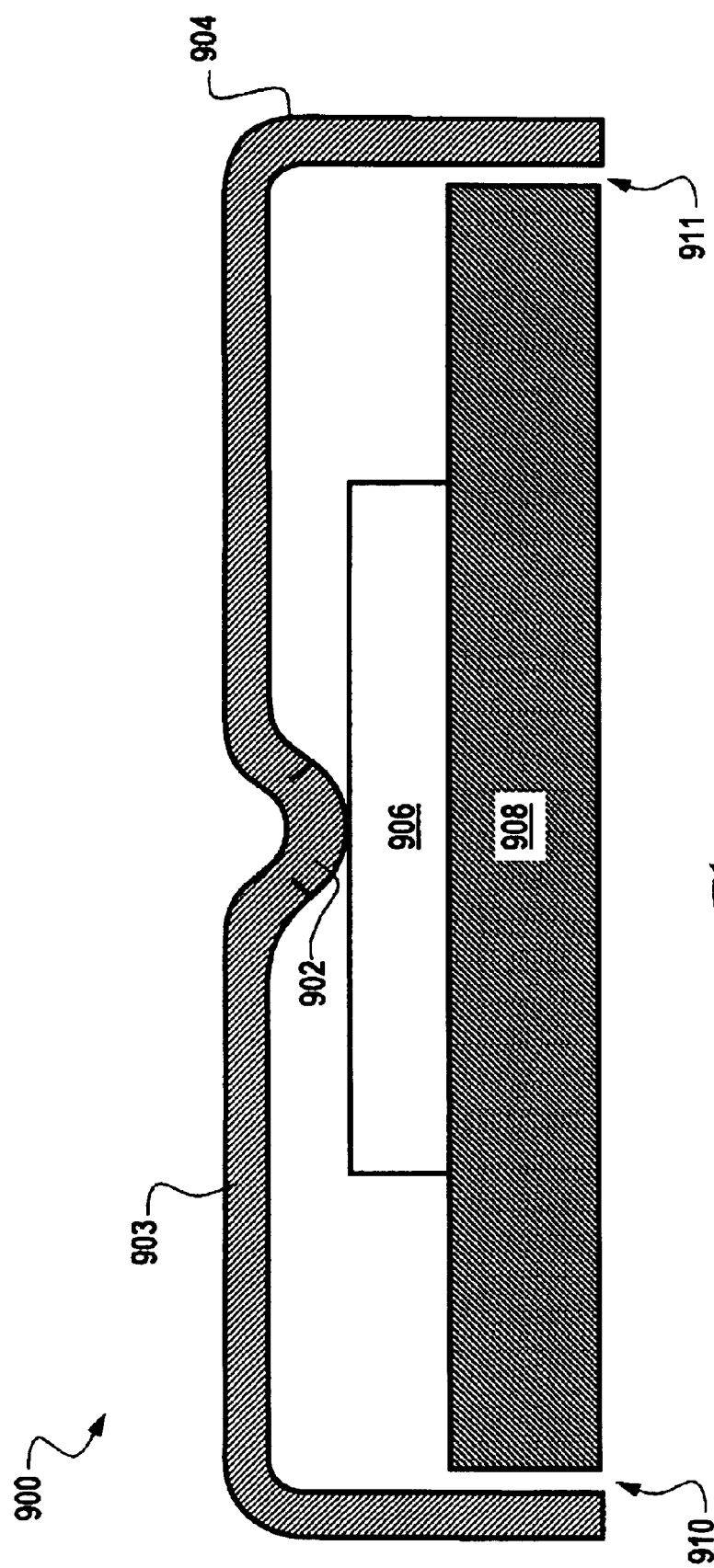
FIG. 9 illustrates a side sectional view of a sensor apparatus having a base, a cover and a clearance thereof, which can be implemented in accordance with a preferred embodiment of the present invention.

FIG. 9 illustrates a side sectional view of a sensor apparatus 900 having a base 908, a cover 904 and a clearance 910 and a clearance 911 therebetween, which can be implemented in accordance with an alternative, but preferred embodiment of the present invention. Apparatus 900 is analogous to sensor 100 of FIG. 1 and the various components depicted in FIGS. 1 to 9, the difference being that apparatus 900 includes a clearance 910 and a clearance 911 between cover 904 and base 908. Cover 904 is analogous, for example, to cover 104 of FIG. 9. Base 908 is analogous to base 108 of FIG. 8. Clearances 910 and 911 thus respectively form gaps between cover 904 and base 908.

Apparatus 900 can thus be configured such that the base 908 is located proximate to cover 904. A sensor element 906 is located on the base 908 in a manner that permits clearances 910 and 911 to form between cover 904 and base 908.

A sensor diaphragm 903 is incorporated into the cover 904. The cover 904 is generally located on the base 908 such that the dimple 902 is in intimate contact with the sensor element 906 at all pressure levels and temperatures thereof.

Dimple 902 of FIG. 9 is generally analogous to the dimple 102 illustrated in FIG. 1. Note that the particular shape and size of dimple 902 may vary, depending on particular applications. The dimple 902 depicted in FIG. 9 is thus presented for illustrative purposes only and the size and shape thereof are not considered limiting features of the present invention, but are directed merely to an alternative embodiment.

It can be appreciated from FIG. 9, that instead of using an interference fit between the cover and base, the components thereof can be designed to form a clearance or gap between the cover and base. Such a design does not rely on an interference between the two parts to maintain preload, but instead can utilize welding, soldering or other connecting means to lock the components in position at the time the cover is assembled to the base.

The components can be designed such that even if the cover is at its smallest inside dimension within the tolerance range and the base is at its largest outside dimension within the tolerance range there will be clearance between them when they are assembled together. Thus, a clearance should exist generally between the cover and base even if the cover is at its smallest dimension within the tolerance range and the base is at its largest dimension within the tolerance range. The intent of such a feature is to produce the parts at their nominal dimension.

Figure 10:
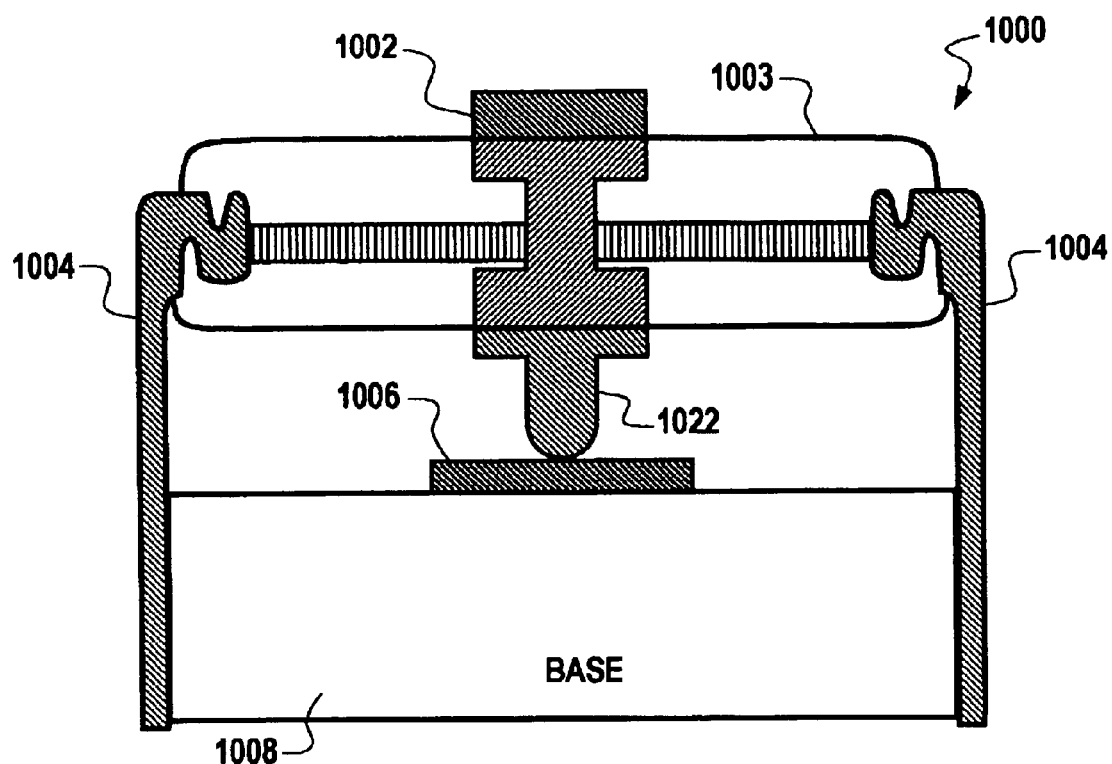
FIG. 10 illustrates a cut-away side view of a sensor with a cover containing a dimple and molded diaphragm, in accordance with a preferred embodiment of the present invention.

FIG. 10 illustrates a cut-away side view of a molded sensor cover 1004 for a pressure sensor 1000, in accordance with a preferred embodiment of the present invention. Sensor cover 1004 generally includes an over mold section 1003 and a dimple 1002 which is centrally located within over mold section 1003 and cover 1004. Dimple 1002 also includes a circular portion 1022 which contacts the sense element 1006, which in turn rests on base 1008.

Figure 11:
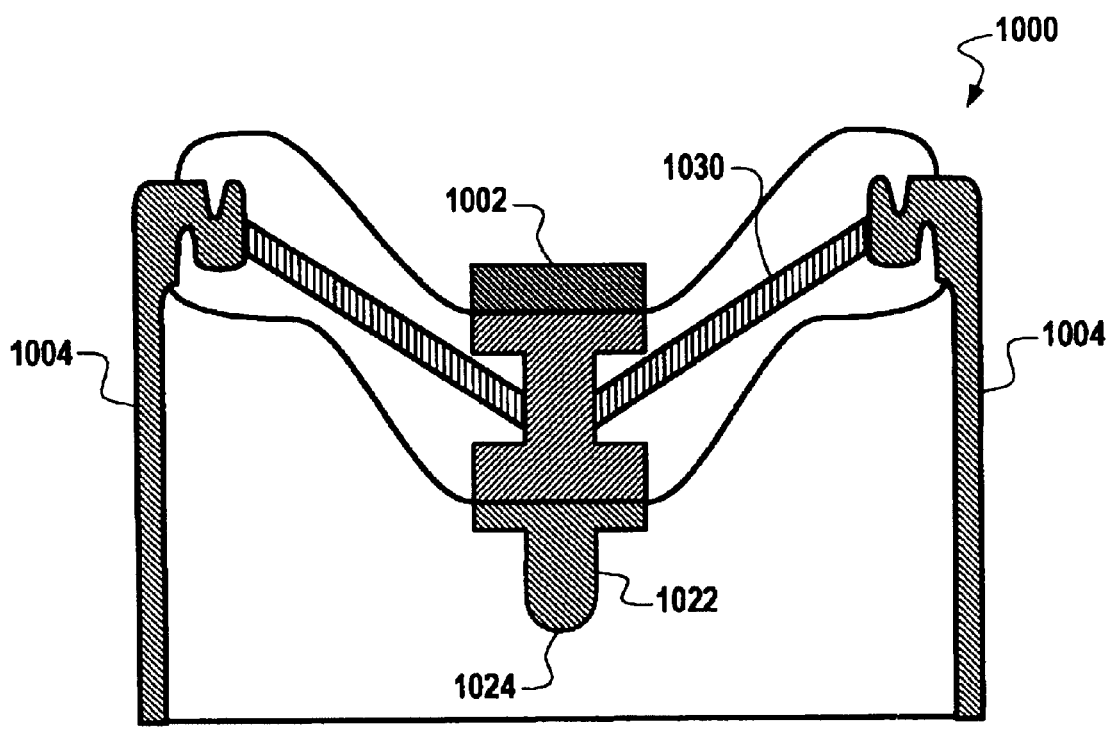
FIG. 11 illustrates a cut-away side view of the sensor cover with a diaphragm as molded, in accordance with a preferred embodiment of the present invention.

FIG. 11 illustrates a cut-away side view of the molded sensor cover 1004 as molded, in accordance with a preferred embodiment of the present invention. Note that in FIGS. 10 and 11, like or analogous parts or components are generally indicated by identical reference numerals. Thus, sensor cover 1004 is shown in FIG. 11 as being molded. A foil 1030 or other material can be utilized to block air permeation through cover 1004. Dimple 1002 includes a dimple surface 1024 external to circular portion 1022. Dimple surface 1024 can be implemented as a highly polished surface to reduce the possibility of stress concentrators that would contact the sense element.

Cover 1004 can thus be implemented as a molded sensor diaphragm that contains dimple 1002, which is a separate component. The surface area on dimple 1002 contacts the sense element 1006 and is highly polished to reduce stress concentrators as indicated above. The profile of dimple 1002 is not constrained by the limits of a stamping operation, but can be designed to provide optimum contact with sense element 1006. Dimple 1002 can be formed from stainless steel, ceramic or other appropriate materials to optimize the performance of sensor 1000. The sensor diaphragm can be molded with a built-in preload to simplify the assembly and preload process. Cover 1004 can be assembled over base 1008 until the bottom of cover 1004 is even with the bottom of base 1008. An operation can then be performed, such as welding, soldering, or another connecting operation to lock the two components together.

Cover 1004 can be produced by forming it from a material that is compatible with permanently attaching it to base 1008. Cover 1004 should preferably contain features to retain the molded material. The dimple 1002 with a polished contact surface can then be produced. Foil 1030 or other material can be added to the interior of the molded diaphragm to block air permeation through the molded material when sensor 1000 is under pressure. The diaphragm can then be molded with an engineering plastic, silicone rubber, or other suitable material that meets performance requirements.

Figure 12:
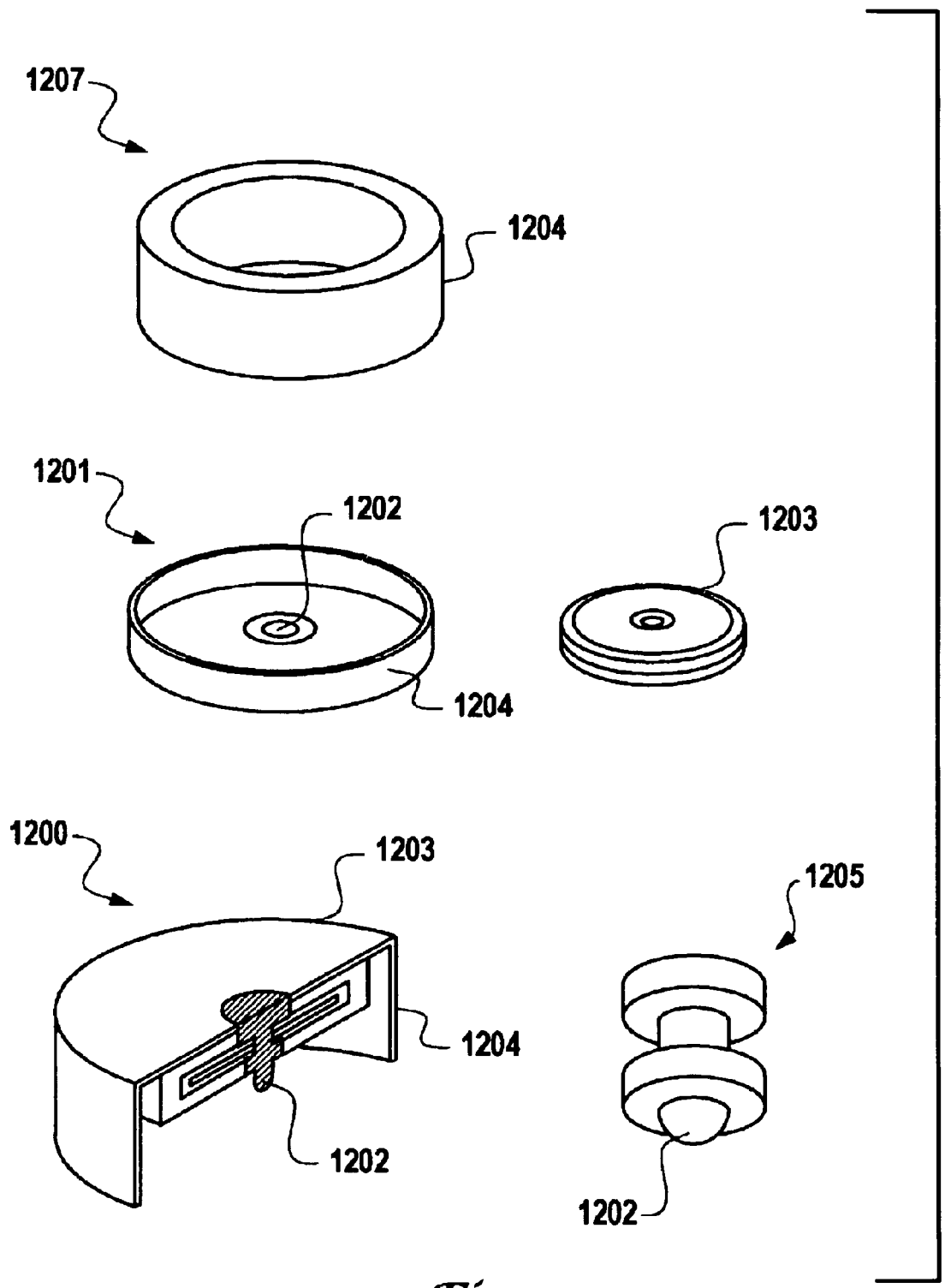
FIG. 12 depicts views of a sensor cover assembly, including individual elements thereof, in accordance with an alternative embodiment of the present invention.

FIG. 12 depicts views of a sensor cover assembly 1200, including individual elements thereof, in accordance with an embodiment of the present invention. Note that in FIG. 12, identical parts are indicated by identical reference numerals. Sensor cover assembly 1200 is shown in FIG. 12 in a cut-away view and includes a cover 1204, a dimple 1202 and a molded diaphragm 1203. FIG. 12 also illustrates an individual view 1205 of dimple 1202. An individual view of the molded diaphragm 1203 is also shown in FIG. 12.

Sensor cover assembly 1200 can be seen in FIG. 12 from a bottom view 1201. FIG. 12 also depicts an individual view 1207 of a cover 1204 by itself. FIG. 12 thus provides views illustrative of a sensor cover assembly 1200, which can be implemented to include a sensor cover 1204, a diaphragm 1203, and a dimple 1202 located centrally within the cover 1204, wherein the dimple 1202 comprises a component that is separate from the sensor cover 1204 and diaphragm 1203.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows.

Having thus described the invention what is claimed is:

1. A diaphragm cover apparatus for a sensor, comprising:
   a diaphragm associated with a sensor cover and a base located proximate to said sensor cover; and
   a dimple located centrally inward and within said diaphragm, wherein said dimple comprise a component that is separate from said diaphragm and wherein said dimple contacts a sense element of said sensor.

2. The apparatus of claim 1 further comprising a foil for blocking air permeation through said diaphragm when said sensor experiences pressure.

3. The apparatus of claim 1 wherein said diaphragm further comprises an over-mold diaphragm that is located within said sensor cover, wherein said dimple is located centrally within said over-mold diaphragm and said sensor cover.

4. The apparatus of claim 1 wherein said dimple comprises a circular portion, which contacts said sense element, and wherein said dimple comprises a highly polished surface to reduce stress concentrators.

5. The apparatus of claim 1 wherein said dimple is formed from a stainless steel material.

6. The apparatus of claim 1 wherein said dimple is formed from a ceramic material.

7. The apparatus of claim 1 wherein said sense element comprises a quartz sense element.

8. The apparatus of claim 1 wherein said sense element comprises a silicon sense element.

9. The apparatus of claim 1 wherein said sense element comprises a ceramic sense element.

10. The apparatus of claim 1 wherein said sense element is in intimate contact with said highly polished surface of said dimple.

11. A sensor diaphragm cover apparatus for a sensor, comprising:

an over-mold diaphragm located within a sensor cover and a base located proximate to said sensor cover;

a dimple located centrally inward and within said sensor cover, wherein said dimple comprise a component that is separate from diaphragm, wherein said dimple contacts quartz sense element of said sensor, and wherein said dimple comprises a highly polished surface to reduce stress concentrators; and a foil for locking air permeation through said diaphragm when said sensor experiences pressure.

12. The apparatus of claim 11 wherein said dimple is formed from a stainless steel material.

13. The apparatus of claim 11 wherein said dimple is formed from a ceramic material.

14. A method for molding a diaphragm cover apparatus for a sensor, said method comprising the steps of:

locating a sensor cover proximate to a base;

molding a diaphragm within said sensor cover; and establishing a dimple centrally inward and within said cover, wherein said dimple comprise a component that is separate from sensor cover and wherein said dimple contacts sense element of said sensor.

15. The method of claim 14 further comprising the step of configuring a foil within said diaphragm to block air permeation through said diaphragm when said sensor experiences pressure, wherein said foil is established as said diaphragm is molded.

16. The method of claim 14 further comprising the step of molding said diaphragm to comprise an over-mold diaphragm molded within said sensor cover.

17. The method of claim 14 further comprising the step of forming a dimple with a highly polished surface to reduce stress concentrators.

18. The method of claim 14 further comprising the step of forming said dimple from a stainless steel material.

19. The method of claim 14 further comprising the step of forming said dimple from a ceramic material.

20. The method of claim 14 further comprising the step of forming said sense element as a quartz sense element.

* * * * *

UNITED STATES PATENT AND TRADEMARK OFFICE
CERTIFICATE OF CORRECTION

PATENT NO. : 6,962,084 B2
APPLICATION NO. : 10/635277
DATED : November 8, 2005
INVENTOR(S) : Kenneth E. Gall It is certified that error appears in the above-identified patent and that said Letters Patent is hereby corrected as shown below:

In Claim 1, column 8, line 55, delete "comprise" and add "comprises";
In Claim 11, column 9, line 21, delete "comprise" and add "comprises";
In Claim 11, column 9, line 23, after "tacts" add "a";
In Claim 11, column 9, line 26, delete "locking" and add "blocking";
In Claim 14, column 19, line 9, delete "comprise" and add "comprises".

Signed and Sealed this

Twenty-second Day of August, 2006

JON W. DUDAS
*Director of the United States Patent and Trademark Office*